US006483961B1

(12) United States Patent
Helkey et al.

(10) Patent No.: US 6,483,961 B1
(45) Date of Patent: Nov. 19, 2002

(54) DUAL REFRACTION INDEX COLLIMATOR FOR AN OPTICAL SWITCH

(75) Inventors: Roger Helkey, Montecito; Adrian Keating, Santa Barbara, both of CA (US)

(73) Assignee: Calient Networks, Inc., San Jose, CA (US)

(*) Notice: Subject to any disclaimer, the term of this patent is extended or adjusted under 35 U.S.C. 154(b) by 0 days.

(21) Appl. No.: 09/585,259

(22) Filed: Jun. 2, 2000

(51) Int. Cl.[7] .................................................. G02B 6/26
(52) U.S. Cl. .............................. 385/18; 385/17; 385/16; 385/19; 385/33; 385/35; 385/42
(58) Field of Search ............................. 385/16, 17, 18, 385/20, 21, 22

(56) References Cited

U.S. PATENT DOCUMENTS

| | | |
|---|---|---|
| 3,492,484 A | 1/1970 | Iti |
| 3,649,105 A | 3/1972 | Treuthart |
| 4,179,183 A | 12/1979 | Tateoka et al. |
| 4,421,381 A | 12/1983 | Ueda et al. |
| 4,479,697 A * | 10/1984 | Kapany ........................ 385/33 |
| 4,574,191 A | 3/1986 | Conrad |
| 4,598,585 A | 7/1986 | Boxenhorn |
| 4,654,663 A | 3/1987 | Alsenz et al. |
| 4,696,062 A | 9/1987 | LaBudde et al. |
| 4,696,545 A | 9/1987 | Lama et al. |
| 4,701,011 A | 10/1987 | Emkey et al. |
| 4,745,357 A * | 5/1988 | Miller ........................... 385/1 |
| 4,815,806 A | 3/1989 | Owen |
| 4,834,484 A | 5/1989 | Gorman et al. |
| 4,834,485 A | 5/1989 | Lee |
| 4,838,637 A | 6/1989 | Torok et al. |
| 4,859,012 A | 8/1989 | Cohn |
| 4,875,756 A | 10/1989 | Estes et al. |
| 4,886,331 A | 12/1989 | Peterson |
| 4,922,756 A | 5/1990 | Henrion |

(List continued on next page.)

FOREIGN PATENT DOCUMENTS

| | | | |
|---|---|---|---|
| GB | 2 175 705 A | 12/1986 | |
| JP | 60-107017 | 6/1985 | |
| JP | 5-107485 A | 4/1993 | |
| JP | 6-180428 | 6/1994 | |
| WO | WO 00/20899 A2 | 4/2000 | ........... G02B/06/42 |

OTHER PUBLICATIONS

Ming C. Wu, "MEMS for Optical and RF Applications." UCLA Extension, Department of Engineering, Information Systems and Technical Management, Engineering: 823.52, Nov. 1–3, 1999.

M.C. Wu, L.–Y Lin, S.–S. Lee, and K.S.J. Pister, "Micromachined Free–Space Integrated Micro–Optics," Sensors and Actuators A, 50, pp. 127–134 (1995).

Joseph E. Ford, Vladimir A. Aksyuk, David J. Bishop, and James A. Walker, "Wavelength Add–Drop Switching Using Tilting Micromirrors," Journal of Lightwave Technology, vol. 17, No. 5, pp. 904–911 (May 1999).

Robert E. Mihailovich, Z. L. Zhang, K. A. Shaw, and Noel C. MacDonald, "Single–Crystal Silicon Torsional Resonators." School of Electrical Engineering, Cornell University, Ithaca, NY 14853, pp. 184–188, (Feb. 1993).

*Primary Examiner*—Brian Healy
*Assistant Examiner*—Kevin S. Wood
(74) *Attorney, Agent, or Firm*—Blakely, Sokoloff, Taylor, Zafman LLP

(57) ABSTRACT

An apparatus comprising an optical fiber array, a spacer to receive a light beam from the optical fiber array, and a lens array having an input to receive the light beam from the spacer and an output to output the light beam is disclosed. The spacer has a first refraction index and the lens has a second refraction index.

36 Claims, 4 Drawing Sheets

U.S. PATENT DOCUMENTS

| | | |
|---|---|---|
| 4,923,269 A | 5/1990 | Healey |
| 4,941,724 A | 7/1990 | Couden et al. ............... 385/48 |
| 4,978,193 A | 12/1990 | Tomita |
| 4,981,335 A | 1/1991 | Gaebe |
| 4,993,796 A | 2/1991 | Kapany et al. |
| 5,016,072 A | 5/1991 | Greiff |
| 5,044,713 A | 9/1991 | Mozer et al. |
| 5,077,622 A | 12/1991 | Lynch et al. |
| 5,077,815 A | 12/1991 | Yoshizawa et al. |
| 5,083,857 A | 1/1992 | Hornbeck |
| 5,097,354 A | 3/1992 | Goto |
| 5,172,262 A | 12/1992 | Hornbeck |
| 5,203,208 A | 4/1993 | Bernstein |
| 5,226,321 A | 7/1993 | Varnham et al. |
| 5,440,654 A | 8/1995 | Lambert, Jr. |
| 5,450,245 A | 9/1995 | Grotzinger et al. |
| 5,488,862 A | 2/1996 | Neukermans et al. |
| 5,524,153 A | 6/1996 | Laor |
| 5,536,988 A | 7/1996 | Zhang et al. |
| 5,627,669 A | 5/1997 | Orino et al. |
| 5,629,790 A | 5/1997 | Neukermans et al. |
| RE35,575 E | 7/1997 | Pan |
| 5,647,033 A | 7/1997 | Laughlin |
| 5,673,139 A | 9/1997 | Johnson |
| 5,689,360 A | 11/1997 | Kurata et al. ............... 359/281 |
| 5,822,125 A | 10/1998 | Meyers |
| 5,920,417 A | 7/1999 | Johnson |
| 5,963,682 A | 10/1999 | Dorschner et al. ............ 385/16 |
| 6,000,280 A | 12/1999 | Miller et al. |
| 6,002,818 A | 12/1999 | Fatehi et al. |
| 6,046,859 A | 4/2000 | Raj |
| 6,097,858 A | 8/2000 | Laor |
| 6,097,859 A | 8/2000 | Solgaard et al. |
| 6,097,860 A | 8/2000 | Laor |
| 6,101,299 A | 8/2000 | Laor |
| 6,208,469 B1 | 3/2001 | Matsuura |
| 6,222,679 B1 | 4/2001 | Nevis |
| 6,253,001 B1 * | 6/2001 | Hoen ......................... 385/17 |
| 6,328,482 B1 * | 12/2001 | Jian .......................... 385/88 |
| 6,330,102 B1 | 12/2001 | Daneman et al. .......... 359/290 |

* cited by examiner

DUAL REFRACTION INDEX COLLIMATOR FOR AN OPTICAL SWITCH

FIELD OF INVENTION

The present invention pertains to the field of micro-electro-mechanical-system (MEMS) devices. More particularly, the present invention relates to a MEMS mirror device having a collimator.

BACKGROUND OF THE INVENTION

A MEMS device is a micro-sized mechanical structure having electrical circuitry fabricated, for example, using conventional integrated circuit (IC) fabrication methods. One type of MEMS device is a microscopic gimbaled mirror device. A gimbaled mirror device includes a mirror component, which is suspended off a substrate, and is able to pivot about two axes. Motion is caused by electrostatic actuation. Electrostatic actuation creates an electric field that causes the mirror component to pivot. By allowing the mirror component to pivot in two axes, the mirror component is capable of having an angular range of motion in which the mirror component can redirect light beams to varying positions across a two-dimensional surface.

The MEMS device also includes a lens array to receive light beams from an input array of optical fibers and to output the light beams onto the mirror component. One prior art method simply attaches the input array of optical fibers directly onto the lens array. A disadvantage of attaching the optical fibers directly to the lens array is that this method results in a reflection of the light beams from the lens array back into the input array of optical fibers due to the poor match between optical indices of the fiber and lens materials.

SUMMARY OF THE INVENTION

An apparatus comprising an optical fiber, a spacer to receive a light beam from the optical fiber, and a lens having an input to receive the light beam from the spacer and an output to output the light beam is disclosed. The spacer has a first refraction index and the lens has a second refraction index.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A collimator including an optical fiber, a spacer to receive a light beam from the optical fiber and a lens to receive the light beam from the spacer and to collimate the light beam is disclosed. The spacer has a first refraction index, and the lens has a second refraction index which is higher than the first refraction index. Thus, the collimator is a dual refraction index collimator.

The refraction index of the spacer may be approximately equal to the effective refraction index of the optical fiber. Because the refraction indices of the spacer and the fiber are chosen to be approximately equal, the light beam will substantially pass from the fiber to the spacer without a significant amount of reflection back into the optical fiber. The amount of light reflected off of the spacer and back into the fiber is significantly less than the amount of light that would be reflected if the optical fiber were connected directly to the lens, which has a different refraction index.

Thus, an advantage of including the spacer in the collimator is enabling a light beam to pass from an optical fiber through a lens having a higher refraction index without reflecting light back into the optical fiber. Because the dual index collimator enables the lens to have a higher refraction index, materials such as silicon may be used to form the lens. The radius of curvature of the high index silicon lens need to be as large as the curvature of a lens made from a lower index material such as glass. The size of the lens is limited by the etch depth. A larger radius of curvature leans using a higher optical index allows a higher lens to be made from Silicon. Therefore, the larger silicon lens can output a collimated light beam that is larger than prior art light beams output from lower index lenses. The larger light beams reduce losses caused by defraction. The dual index collimator thus can be used in an optical switch to provide larger collimated light beams and to reduce losses caused by defraction.

Figure 1:
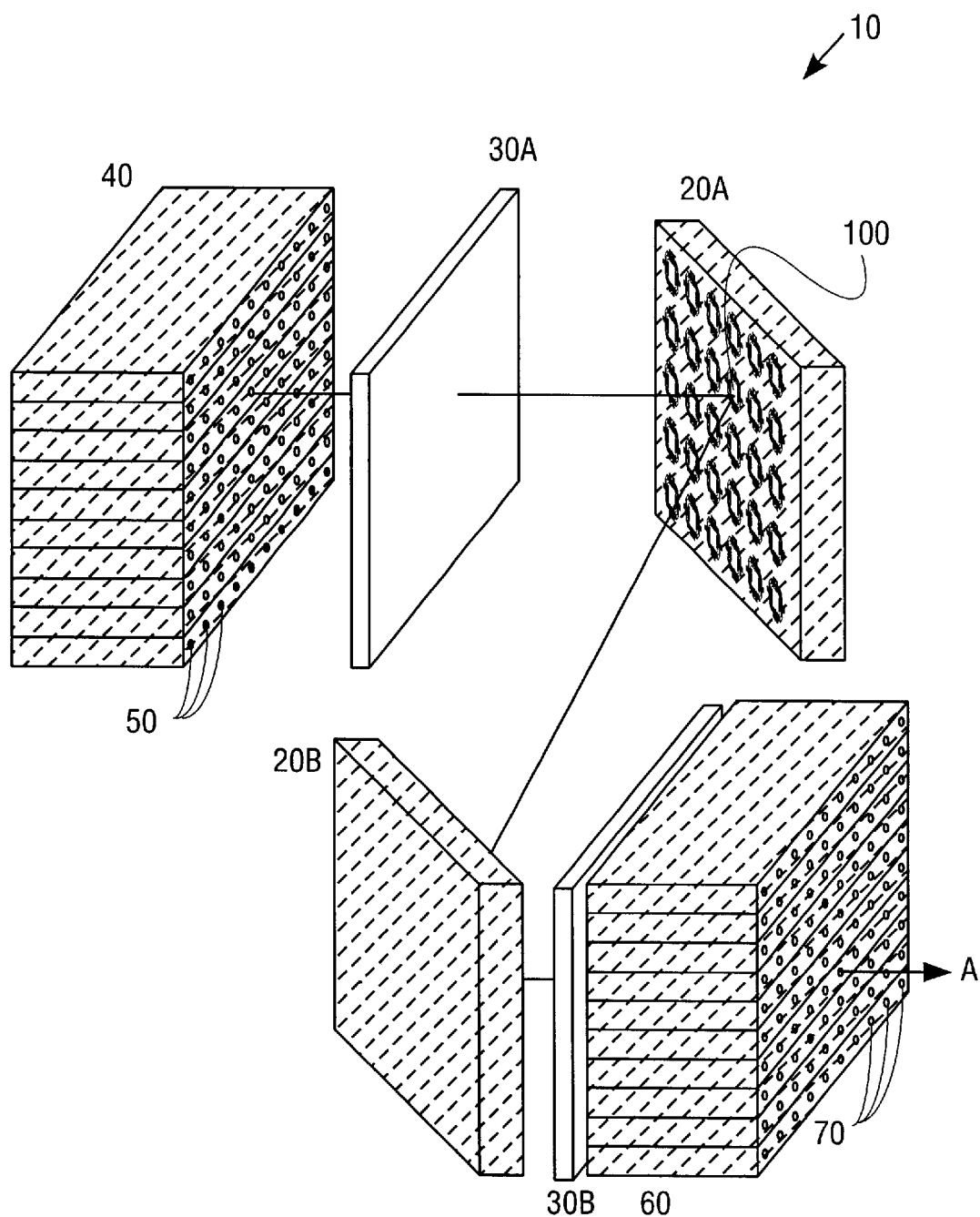
FIG. 1 is an illustration of an exemplary optical switching system for practicing the invention.

FIG. 1 is an illustration of an exemplary optical switching system 10 for practicing the invention. For example, optical switching system 10 may represent a 3-dimensional optical switching system. A 3-dimensional optical switching system allows for optical coupling between input fibers and output fibers in different planes using lens arrays and mirror arrays. The lens arrays and mirror arrays provide proper angle and position of light beams traveling from input fibers to output fibers. That is, a light beam must leave and enter a fiber in a direct path. Thus, using the optical switch shown in FIG. 1, any optical input can be connected to any optical output through the mirror arrays 20a and 20b, which contain mirrors that can be rotated along two axes.

Referring to FIG. 1, optical switching system 10 includes input fiber array 40, collimator 30A, first MEMS mirror array 20A, second MEMS mirror array 20B, second lens array 30B, and output fiber array 60.

Input fiber array 40 provides a plurality of optical fibers 50 for transmitting light to collimator 30A. Collimator 30A includes a plurality of optical lenses, which are used to focus beams of light from input fiber array 50 to individual MEMS mirror devices on MEMS mirror array 20A, and a spacer located between input fibers and the lenses. MEMS mirror array 20A includes a plurality of electrically addressable MEMS mirror devices 100.

MEMS mirror device 100 may be a gimbaled mirror device having a rectangular shape. Alternatively, MEMS mirror device 100 may be a gimbaled mirror device having an elliptical or circular shape. The plurality of MEMS mirror devices 100 for MEMS mirror array 20A can pivot a mirror component to redirect or reflect light to varying MEMS mirror devices on second MEMS mirror array 20B. Second MEMS mirror array 20B also includes a plurality of MEMS mirror devices such as MEMS mirror device 100, which are used to redirect and reflect light beams to varying lenses on lens array 30B. Second lens array 30B focuses beams of light from second mirror array 20B to individual output fibers 70 of output fiber array 60.

Optical switching system 10 allows light beams from any input fiber 50 of input fiber array 40 to be redirected to any output fiber 70 of output fiber array 60. For example, a light beam following the path "A" is outputted from one input fiber and is redirected using MEMS mirror arrays 20A and 20B to a different output fiber. The MEMS mirror arrays may also be used in scanning systems, printing systems, display systems, and other systems that require redirecting beams of light.

Figure 2:
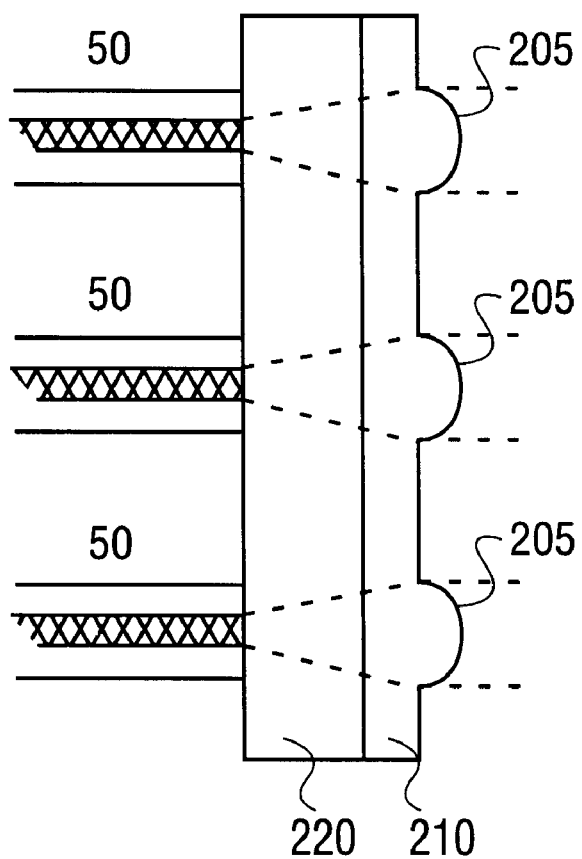
FIG. 2 is a top view of an exemplary embodiment of a dual index collimator.

FIG. 2 shows a top view of the dual index collimator of FIG. 1. The input fiber array 40 includes a plurality of input fibers 50. The spacer 220 receives the light beams from the input fibers and outputs each light beam to a corresponding lens 205 of lens array 210. The lenses 205 collimate the light beams, so that each output light beam from each lens 205 is approximately collimated.

Figure 3:
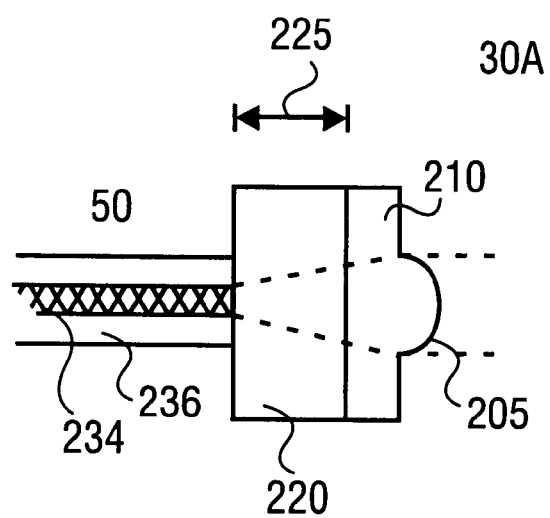
FIG. 3 is an illustration of a side view of an exemplary dual index collimator for an optical switch.

FIG. 3 shows a top view of an embodiment of the dual refraction index collimator 30A shown in FIGS. 1 and 2. Although a single column of lenses is shown, there may be multiple columns of lenses. Collimator 30a receives light beams from input fibers 50 of input fiber array 40. Each input fiber 50 contains a light guiding region 234 surrounded by outer core 236. The index of refraction of light guiding region 234 is higher than the index of refraction of outer core 236, so that as a light beam travels through input fiber 50, the beam will be confined to the higher index region of light guiding region 234.

Collimator 30A includes lens array 210 that includes two or more lenses 205. Lens array 210 may be made of silicon. Using silicon to form the lens array enables the curvature of the lenses 205 to be relatively large. As a result, the optical beams that pass through the lenses 205 can also be relatively large, thus reducing losses caused by diffraction of the light beams.

The silicon lenses 205 in lens array 210 have an index of refraction that is higher than the effective index of refraction of the input fibers 40. Therefore, spacer 220 is used to reduce the reflection of light from the input of lens array 205 back into the input fibers 50 of input fiber array 40. The index of refraction of the spacer is chosen to be approximately equal to the effective index of refraction of each input fiber 50. In one embodiment, the spacer 220 is made from glass. As a light beam passes from input fiber 50 into the spacer 220, the reflection of the beam back into the input fiber 50 is reduced because the input fiber 50 and the spacer 220 have approximately the same index of refraction.

After the light beam leaves the input fiber 50, it travels through spacer 220, which has no light guiding region. Therefore, the light beam expands as it travels through spacer 220. The spacer 220 has a width 225 that enables the light beam to be approximately collimated when the beam is output from a corresponding lens in lens array 210. A collimated light beam maintains its radius as it travels through space.

Figure 4:
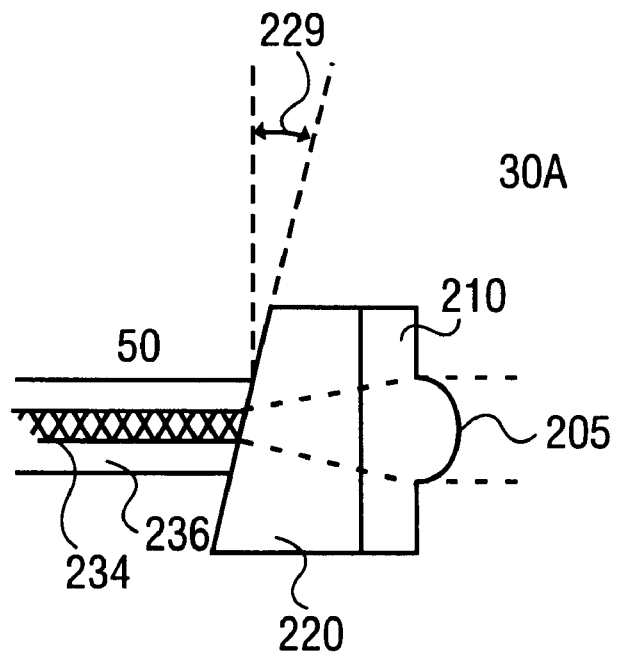
FIG. 4 is an alternative embodiment of a side view of a dual index collimator for an optical switch.

Although input fiber 50 and spacer 220 have approximately the same in index of refraction, there may still be some back-reflection of the light beam as the beam travels from the input fiber to the spacer. FIG. 4 shows an alternative embodiment of collimator 30A that further reduces back-reflection of the beam into the input fiber 50. The optical input fiber 50 and the spacer 220 are both polished and joined together at an angle 229. The angle 229 is selected such that any optical reflections of the light beam at the boundary of the fiber 50 and spacer 220 will return to the fiber 50 at an angle that is outside the angle of acceptance of the fiber 50.

The light-transmitting effectiveness of collimator 30A may be further improved by removing gaps at the boundary between input fiber 50 and the spacer 220. These gaps may be removed by polishing both of the surfaces, until they are relatively flat. Thus, when the two surfaces are placed together, the amount of gaps between the two surfaces will be reduced because of the polishing.

Alternatively, a liquid such as an epoxy gel, may be placed at the boundary between the surfaces of the input fiber and the spacer. The epoxy gel will thus fill any gaps that may be present between the two surfaces. The epoxy gel may have an index of refraction that is approximately the same as the effective index of refraction of the input fiber 50 and spacer 220. The epoxy gel may also be placed at the boundary between the surface of the spacer 220 and the surface of the lens array 210. The epoxy gel may become solid when the gel is exposed to ultraviolet light. Alternatively, the gel may become solid when cured by heat.

Optical reflection of the light beam may also occur when the light beam passes from spacer 220 into lens array 210, because the index of refraction of spacer 220 is lower than the index of refraction of lens array 210. The boundary between the surface of lens array 210 and the surface of spacer 220 may be coated with an anti-reflection coating to approximately match the index of refraction of the two different substrates, thus reducing back-reflection as the light beam travels from the spacer to the lens array.

In the foregoing specification, the invention has been described with reference to specific exemplary embodiments thereof. It will, however, be evident that various modifications and changes may be made thereto without departing from the broader spirit and scope of the invention as set for in the appended claims. The specification and drawings are, accordingly, to be regarded in an illustrative rather than a restrictive sense.

What is claimed is:

1. An apparatus comprising:
   an array of two or more optical fibers having an output;
   a spacer coupled with at least one of the two or more optical fibers to receive a light beam from the output of at least one of the optical fibers having a first refraction index; and
   an array of two or more lenses coupled with the spacer and having an input to receive the light beam from the spacer and an output to output the light beam, said two or more lens having a second refraction index.

2. The apparatus of claim 1, wherein the second refraction index is higher than the first refraction index.

3. The apparatus of claim 1, wherein the spacer causes the light beam received from the optical fiber to expand.

4. The apparatus of claim 3, wherein the light beam output by the lens is approximately collimated.

5. The apparatus of claim 1 further comprising:
   an epoxy between the optical fiber and the spacer.

6. The apparatus of claim 5, wherein the epoxy has a refraction index that approximately matches the refraction index of the spacer.

7. The apparatus of claim 1, wherein the lens array comprises silicon, Callium Arsenide, Indium Phosphide, Fused silicon, high index glass, epoxy, and photoresist.

8. The apparatus of claim 1, wherein the first refraction index of the spacer is approximately the same as the effective refractive index of the optical fiber.

9. The apparatus of claim 1, wherein the spacer comprises glass.

10. An optical switch comprising:
   an input port having an array of bi-directional optical fibers;
   a spacer coupled with the optical fibers to receive light beams, the first array of optical fiber input ports having a first refraction index;
   a first array of lenses coupled with the spacer to collimate the light beams from the spacer, said lens having a second refraction index;
   a second array of lenses to collimate the light beams from the first array of lenses;
   an output port having an array of bi-directional optical fibers to receive the light beams from the second array of lenses; and
   a plurality of mirrors to optically connect an optical fiber in the input port to an optical fiber in the output port.

11. The switch of claim 10, wherein the mirrors of the optical switch can rotate about two axes.

12. The switch of claim 10, wherein the spacer is used to control the distance from the fiber array to the lens array, so that the output light beam is approximately collimated.

13. The switch of claim 10, wherein the optical switch further comprises a one-dimensional array of optical inputs and a one-dimensional array of optical outputs.

14. The switch of claim 10, wherein the mirrors can move only in one axis.

15. The switch of claim 10, wherein the optical switch uses a two-dimensional array of optical inputs and a two-dimensional array of optical outputs.

16. The switch of claim 10, wherein the mirrors can rotate in two axes.

17. An optical switch comprising:
   an input port having an array of bi-directional optical fibers;
   a spacer to receive light beams the first array of optical fiber input ports having a first refraction index;
   a first array of silicon lenses to collimate the light beams from the spacer, said lens having a second refraction index;
   a second array of silicon lenses to collimate the light beams from the first array of lenses;
   an output port having an array of bi-directional optical fibers to receive the light beams from the second array of lenses; and
   a plurality of mirrors to optically connect an optical fiber in the input port to an optical fiber in the output port.

18. The apparatus of claim 17, wherein the mirrors of the optical switch can rotate about two axes.

19. The apparatus of claim 17, wherein the spacer is used to control the distance from the fiber array to the lens array, so that the output light beam is approximately collimated.

20. An apparatus, comprising:
   a first optical fiber having a first index of refraction;
   a first spacer coupled with the first optical fiber, the spacer having a second index of refraction approximately equal to the first index of refraction of the first optical fiber; and
   a first lens coupled with the first spacer.

21. The apparatus of claim 20, wherein the first lens has a third index of refraction higher than the first index of refraction of the first optical fiber.

22. The apparatus of claim 21, wherein the first optical fiber and the first spacer are coupled together at an angle.

23. The apparatus of claim 21, wherein the first optical fiber propagates a light beam along a longitudinal direction and wherein the angle is a non-perpendicular angle relative to the longitudinal direction of travel of the light beam.

24. The apparatus of claim 23, wherein the first lens has a third index of refraction higher than the first index of refraction of the first optical fiber.

25. The apparatus of claim 20, further comprising:
   a second optical fiber having the first index of refraction and disposed in a fiber array with the first optical fiber, the second optical fiber coupled with the first spacer; and
   a second lens disposed in a lens array with the first lens, the second lens coupled with the first spacer.

26. The apparatus of claim 25, wherein the first and second lenses have a third index of refraction higher than the first index of refraction of the first and second optical fibers.

27. The apparatus of claim 25, wherein the first optical fiber and the second optical fiber are each coupled to the first spacer at an angle.

28. The apparatus of claim 27, wherein the angle is non-perpendicular angle relative to a longitudinal direction of travel of light beams in the first and second fibers.

29. The apparatus of claim 28, wherein the first and second lenses have a third index of refraction higher than the first index of refraction of the first and second optical fibers.

30. The apparatus of claim 20, further comprising:
   a second optical fiber having the first index of refraction and disposed in a fiber array with the first optical fiber;
   a second spacer coupled with the second optical fiber, the second spacer having the second index of refraction; and
   a second lens disposed in a lens array with the first lens, the second lens coupled with the second spacer.

31. The apparatus of claim 30, wherein the first and second lenses have a third index of refraction higher than the first index of refraction of the first and second optical fibers.

32. The apparatus of claim 30, wherein the first and second optical fibers are coupled to the first and second spacers, respectively, at an angle.

33. The apparatus of claim 32, wherein the angle is non-perpendicular angle relative to a longitudinal direction of travel of light beams in the first and second fibers.

34. The apparatus of claim 33, wherein the first and second lenses have a third index of refraction higher than the first index of refraction of the first and second optical fibers.

35. An apparatus, comprising:
   an optical fiber;
   a lens; and
   first means for outputting light from the optical fiber to the lens without a significant amount of back reflection of light into the optical fiber.

36. The apparatus of claim 35, further comprising second means for further reducing the back reflections of light into the optical fiber.

* * * * *